(12) United States Patent
Murata et al.

(10) Patent No.: US 8,197,142 B2
(45) Date of Patent: Jun. 12, 2012

(54) BEARING APPARATUS

(75) Inventors: Junji Murata, Kashiba (JP); Kazuyoshi Yamakawa, Nishinomiya (JP); Toshiyuki Saito, Kashiba (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 450 days.

(21) Appl. No.: 12/318,802

(22) Filed: Jan. 8, 2009

(65) Prior Publication Data

US 2009/0175569 A1 Jul. 9, 2009

(30) Foreign Application Priority Data

Jan. 9, 2008 (JP) ................................. 2008-002303

(51) Int. Cl.
*F16C 33/10* (2006.01)
*F16C 9/00* (2006.01)
*F16C 19/00* (2006.01)
*F01M 1/00* (2006.01)

(52) U.S. Cl. ........ 384/288; 384/457; 384/462; 384/473; 184/6.8

(58) Field of Classification Search .................. 384/288, 384/294, 429, 430, 432, 433, 434, 457, 462, 384/473, 474, 475; 123/195 R, 196 R; 184/6.5, 184/6.8
See application file for complete search history.

(56) References Cited

U.S. PATENT DOCUMENTS

| | | | | |
|---|---|---|---|---|
| 4,669,894 A | * | 6/1987 | Hallerback | .................... 384/477 |
| 4,763,957 A | * | 8/1988 | Poehlmann et al. | ....... 301/110.5 |
| 5,749,660 A | * | 5/1998 | Dusserre-Telmon et al. | . 384/475 |
| 6,868,810 B2 | * | 3/2005 | Hojo et al. | .................... 123/54.4 |
| 2006/0104556 A1 | * | 5/2006 | Tidwell | .......................... 384/294 |
| 2006/0159378 A1 | * | 7/2006 | Plona | ............................. 384/462 |
| 2008/0240641 A1 | | 10/2008 | Waseda et al. | |
| 2008/0253709 A1 | * | 10/2008 | Kikuchi et al. | ............... 384/473 |

FOREIGN PATENT DOCUMENTS

| | | |
|---|---|---|
| JP | 46-24722 U | 8/1971 |
| JP | 53-15406 U | 2/1978 |
| JP | 62-141315 A | 6/1987 |
| JP | 63-62623 U | 4/1988 |
| JP | 2-217620 A | 8/1990 |
| JP | 2-132126 U | 11/1990 |
| JP | 3-7528 U | 1/1991 |
| JP | 6-35655 | 5/1994 |
| JP | 2006-329382 A | 12/2006 |
| JP | 2007-024207 | 2/2007 |
| JP | 2007-270850 A | 10/2007 |
| JP | 2008-232310 | 10/2008 |

\* cited by examiner

*Primary Examiner* — Thomas R Hannon
*Assistant Examiner* — Adam D Rogers
(74) *Attorney, Agent, or Firm* — McGinn IP Law Group PLLC (57) ABSTRACT

A bearing apparatus includes: two split outer ring halves which includes outer ring raceway surfaces and are disposed within a supporting hole of the housing, respectively; and a plurality of rollers which are disposed on respective inner surfaces of the both split outer ring halves and supports a shaft. Each of the two split outer ring halves includes an oil hole penetrating the split outer ring half in a radial direction thereof and an oil groove formed on an outer diameter surface of the split outer ring half along a circumferential direction thereof to allow the oiling passage and the oil holes to communicate with each other. Each of the oil holes is disposed at a position located at an angle of within 45° from the joint surface of the split outer ring halves in an opposite direction to a rotating direction of the shaft.

8 Claims, 5 Drawing Sheets

BEARING APPARATUS

BACKGROUND OF THE INVENTION

The present invention relates to a bearing apparatus, and more particularly to a bearing apparatus comprised of a split-type rolling bearing and a housing which supports the rolling bearing.

In an engine of such as an automobile or a marine vessel, a bearing for supporting a crankshaft which converts the reciprocating motion of a piston into rotational motion is disposed between adjacent counterweights or between a counterweight and a large end of a connecting rod, so that a split bearing which is circumferentially split in two halves is used.

Sliding bearings have generally been used as the aforementioned supporting bearings. However, since there has been an increasing demand for engines with less fuel consumption in recent years, the use of rolling bearings which are circumferentially split in place of the aforementioned sliding bearings has been proposed to reduce the rotational loss.

This split-type rolling bearing has, for example, a pair of split outer ring halves, a plurality of rollers disposed so as to be capable of rolling on the respective inner diameter surfaces of the both split outer ring halves, and a pair of split cage halves for retaining the respective rollers so as to dispose them at substantially equal intervals in the circumferential direction. Further, a crankshaft is fitted in the rolling bearing as an inner ring member, and the rolling bearing is incorporated in the large end of the connecting rod.

With such a rolling bearing, when it is incorporated into the large end of the connecting rod, there are cases where a radial offset (stepped portion) occurs at joint surfaces of the mutually opposing split outer ring halves. If the positional offset occurs at the split outer ring halves, there is a possibility that noise and vibration can be generated when the rollers roll over the vicinities of the joint surfaces of the outer ring where this positional offset occurred.

Figure 5:
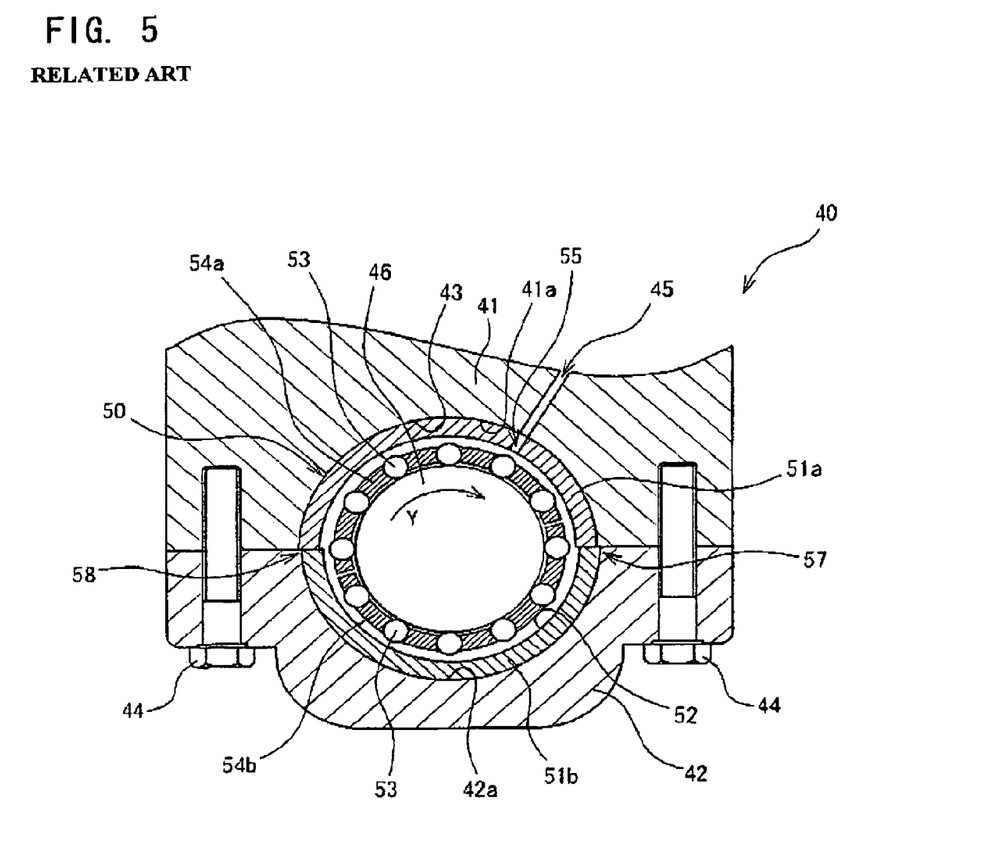
FIG. 5 is an explanatory cross-sectional view of a housing to which a related bearing apparatus is applied.

With rolling bearings, to allow the rolling elements to roll smoothly on the raceway surfaces, it is practiced to form an oil film on the raceway surfaces by supplying lubricating oil into the space where the rolling elements roll, to thereby alleviate the impact during the rolling of the rolling elements. FIG. 5 shows a related bearing apparatus which is provided with an oiling passage for such oil filling.

As shown in FIG. 5, this bearing apparatus has an engine crankshaft fixing portion 40 which is a housing. The crankshaft fixing portion 40 includes an upper block 41 having a semicircular recessed portion 41a as well as a lower block 42 having a semicircular recessed portion 42a and adapted to be integrally joined to the upper block 41. A supporting hole 43 for supporting a split-type rolling bearing 50 in close contact therewith is formed by the both semicircular recessed portions 41a and 42a. The upper block 41 and the lower block 42 are integrally fixed by fixing bolts 44.

An oiling passage 45 for supplying lubricating oil to the split-type rolling bearing 50 is formed in the upper block 41. This oiling passage 45 is formed in such a manner as to extend from diagonally above (diagonally above in FIG. 5) through the upper block 41 and to be open to the aforementioned supporting hole 43. Further, the split-type rolling bearing 50 is disposed in the supporting hole 43 in close contact therewith, and a crankshaft 46 is fitted in this split-type rolling bearing 50.

The split-type rolling bearing 50 has a pair of split outer ring halves 51a and 5b, a plurality of rollers 53 disposed so as to be capable of rolling on an outer ring raceway surface 52 formed on respective inner diameter surfaces of the split outer ring halves 51a and 51b, and a pair of split cage halves 54a and 54b for retaining the respective rollers 53 so as to dispose them at substantially equal intervals in the circumferential direction.

Further, an oil hole 55 is formed in one split outer ring half 51a, which is disposed on the upper side, in such a manner as to communicate with the aforementioned oiling passage 45 and to penetrate the split outer ring half 51a in the radial direction.

In addition, the circumferential both ends of both split outer ring halves 51a and 51b abut against each other, and these abutment surfaces constitute joint surfaces (i.e., mating plates) 57 and 58. Stepped portions such as the one described above can possibly occur at such joint surfaces 57 and 58.

As lubricating oil is supplied to the rollers 53 or the raceway surfaces through the oiling passage 45 such as the one shown in FIG. 5, an oil film is formed on the relevant raceway surfaces, and the impact during the rolling of the rollers 53 is alleviated by this oil film.

It is expected that the vibration and noise when the rollers 53 pass the stepped portions at the joint surfaces 57 and 58 are alleviated by sufficiently supplying lubricating oil. With the related bearing apparatus, however, the vibration and noise occurred due to the following reasons.

Namely, since the oil hole 55 is formed at a position opposing the oiling passage 45 formed in the upper block 41, the oil hole 55 is at a position distant from the joint surfaces 57 and 58, particularly the joint surface 58. This joint surface 58 is at a position distant from the oil hole 55 in an opposite direction to the rotating direction (see arrow Y in FIG. 5) of the crankshaft 46, i.e., at a position distant from the oil hole 55 by an angle of more than 180° in the rotating direction of the crankshaft 46.

For this reason, the lubricating oil which is supplied from the oil hole 55 cannot be sufficiently supplied to the outer ring raceway surface 52 in the vicinities of the mating plates 57 and 58, particularly the mating plates 58. As a result, an oil film with a thickness of such an extent as to make it possible to alleviate the impact of the rollers 53 rolling in the vicinities of these mating plates 58 is not formed on the outer ring raceway surface 52 in the vicinities of the mating plates 58.

In addition, in the split-type rolling bearing 50 shown in FIG. 5, its upper portion and lower portion constitute a loaded zone (side which is subjected to a load) of the bearing, and since the aforementioned oil hole 55 is provided in that loaded zone, the following problem is encountered.

Namely, the rollers 53 rolling in the loaded zone are subjected to a greater load than the rollers 53 rolling in a non-leaded zone, and if the oil hole 55 is formed in this loaded zone, a stress concentration occurs at the peripheral edge of the oil hole 55 when the rollers 53 pass the outer ring raceway surface 52 including the oil hole 55. As the stress is applied to the peripheral edge in a concentrated manner, there is a possibility of a decline in the service life of the bearing.

SUMMARY OF THE INVENTION

The invention has been devised in view of the above-described circumstances, and its object is to provide a bearing apparatus which is capable of substantially suppressing the noise and vibration occurring when the rollers roll in the vicinities of the mating plates of the split outer ring halves and of capable of alleviating the stress concentration occurring when the rollers roll on the peripheral edges of the oil holes in the split outer ring halves.

To attain the above object, in accordance with a first aspect of the invention there is provided a bearing apparatus for supporting a shaft to a housing which includes a support hole and an oiling passage connected to the supporting hole to supply lubricating oil, the bearing apparatus comprising:

two split outer ring halves which includes outer ring raceway surfaces formed on the inner surfaces of the split outer ring halves and joint surfaces formed at circumferential ends of the split outer ring halves and are disposed in close contact with each other at the joint surfaces within the supporting hole of the housing, respectively; and a plurality of rollers which are disposed so as to be capable of rolling on the outer ring raceway surface and support the shaft, wherein each of the two split outer ring halves includes an oil hole penetrating the split outer ring half in a radial direction thereof and an oil groove formed on an outer diameter surface of the split outer ring-half along a circumferential direction thereof to allow the oiling passage and the oil holes to communicate with each other, and wherein each of the oil holes is disposed at a position located at an angle of within 45° from the joint surface of the split outer ring halves in an opposite direction to a rotating direction of the shaft.

In the bearing apparatus in accordance with the above-described first aspect of the invention, each of the oil holes for supplying lubricating oil to the bearing interior is disposed at a position located at an angle of within 45° from the joint surface of the split outer ring halves in an opposite direction to the rotating direction of the shaft. These oil holes and the oiling passage formed in the housing are communicated with each other by an oil groove formed on outer diameter surfaces of the split outer ring halves along a circumferential direction thereof. Since the oil holes are thus disposed in the vicinities of the mating plates and at upstream-side positions by using the rotating direction of the shaft as a reference, the lubricating oil from the oil holes can be supplied efficiently to the vicinities of the mating plates of the both split outer ring halves by the rotation of the shaft and the rolling of the rollers. As a result, an oil film can be reliably formed on the outer ring raceway surface in the vicinity of the mating plates. Consequently, it is possible to alleviate the impact of the rollers passing the vicinities of the mating plates and thereby suppress the generation of vibration and noise.

In addition, since the oil holes are respectively disposed outside the loaded zone of the bearing, i.e., in a non-loaded zone, it is possible to alleviate the concentration of the stress at the peripheral edges of the oil holes when the rollers pass the oil holes. The service life of the bearing can be thereby prolonged.

According to a second aspect of the invention, preferably, a pair of annular rib portions which project radially inward are respectively formed at both axial ends of respective inner diameter surfaces of the split outer ring halves, and a pair of recess portions recessed radially outward are each provided at a boundary portion between the outer ring raceway surface and an inner side surface of each of the pair of rib portions.

In this case, since each oil hole is open to the recess portion provided at a boundary portion between the inner side surface of each rib portion and the outer ring raceway surface, the rollers rolling on the outer ring raceway surface are not brought into direct contact with peripheral edges of the oil holes. For this reason, it is possible to virtually eliminate the stress concentration at the peripheral edges of the oil holes, which would otherwise occur due to the direct contact with the peripheral edges of the oil holes.

According to the bearing apparatus in accordance with the invention, it is possible to alleviate the impact of the rollers rolling in the vicinities of the mating plates of the both split outer ring halves so as to substantially suppress the noise and vibration occurring due to the impact, and alleviate the stress concentration occurring when the rollers roll on the peripheral edges of the oil holes in the split outer ring halves.

DESCRIPTION OF PREFERRED EMBODIMENTS

Referring now to the accompanying drawings, a detailed description will be given of an embodiment of the bearing apparatus in accordance with the invention.

Figure 1:
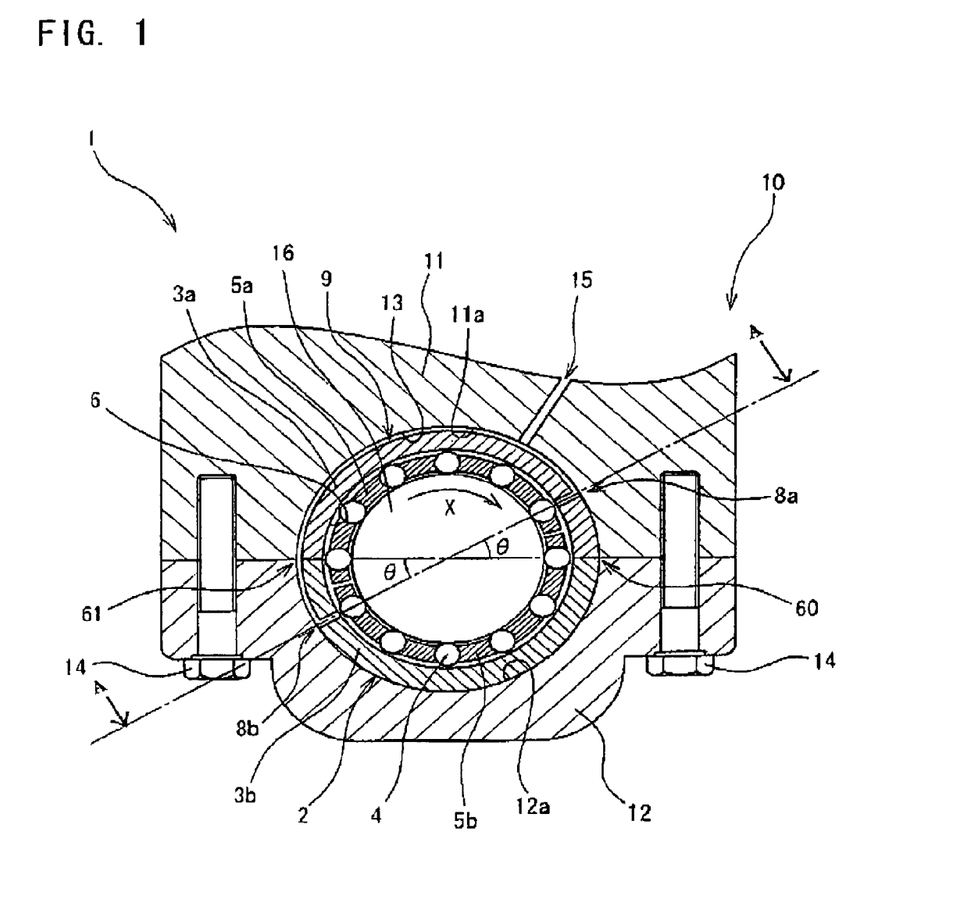
FIG. 1 is an explanatory cross-sectional view of a bearing apparatus in accordance with an embodiment of the invention.
Figure 2:
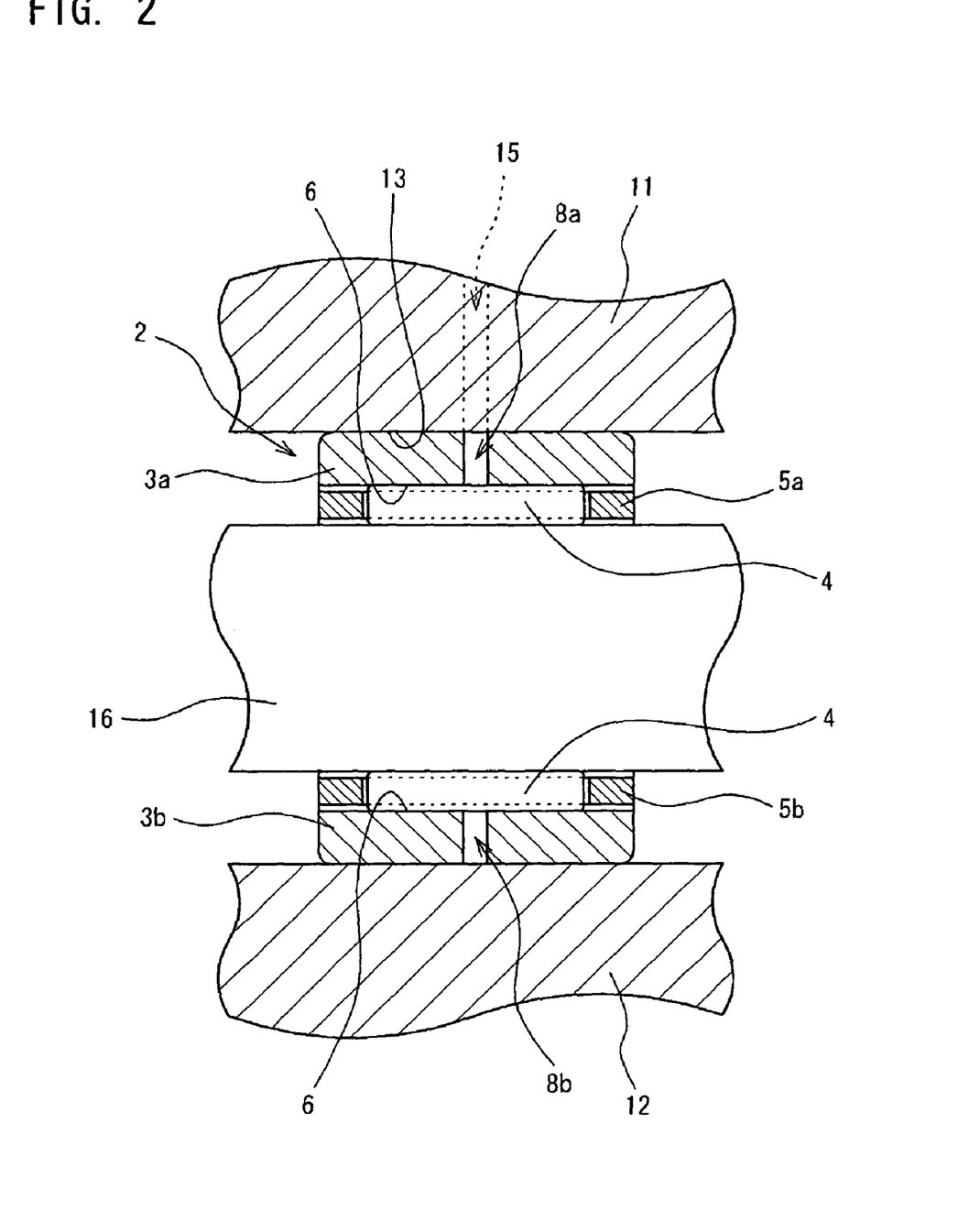
FIG. 2 is a cross-sectional view taken along line A-A in FIG. 1.

FIG. 1 is an explanatory cross-sectional view of a bearing apparatus 1 in accordance with a first embodiment of the invention. FIG. 2 is a cross-sectional view taken along line A-A in FIG. 1.

The bearing apparatus 1 shown in FIG. 1 has an engine crankshaft fixing portion 10 which is a housing. The crankshaft fixing portion 10 includes an upper block 11 (first housing part) having a cross-sectionally substantially semicircular recessed portion 11a and a lower block 12 (second housing part) having a cross-sectionally substantially semicircular recessed portion 12a and adapted to be integrally joined to the upper block 11. A supporting hole 13 for supporting a split rolling bearing 2 in close contact therewith is formed by the both cross-sectionally substantially semicircular recessed portions 11a and 12a. The upper block 11 and the lower block 12 are integrally fixed by fixing bolts 14.

An oiling passage 15 for supplying lubricating oil to the split rolling bearing 2 is formed in the upper block 11. This oiling passage 15 is formed in such a manner as to extend from diagonally above (diagonally above in FIG. 1) through the upper block 11 and to be open to the aforementioned supporting hole 13. Further, the split rolling bearing 2 is disposed in the supporting hole 13 in close contact therewith, and a crankshaft 16 is fitted in this split rolling bearing 2.

The rolling bearing 2 has a pair of split outer ring halves 3a and 3b, a plurality or rollers 4 disposed so as to be capable of rolling on an outer ring raceway surface 6 formed on respective inner diameter surfaces of the split outer ring halves 3a and 3b, and a pair of split cage halves 5a and 5b having a plurality of pockets for retaining the respective rollers 4 at substantially equal intervals in the circumferential direction. In addition, the circumferential ends of both split outer ring halves 3a and 3b abut against each other, and these abutment surfaces constitute joint surfaces 60 and 61.

Oil holes 8a and 8b, which respectively penetrate both split outer ring halves 3a and 3b in the radial direction and are open to the outer ring raceway surface 6, are formed in both split outer ring halves 3a and 3b. The oil hole 8a is disposed at a position located at an angle θ from the joint surface 60 in an opposite direction to the rotating direction (see arrow X in FIG. 1) of the crankshaft 16, while the oil hole 8b is disposed at a position located at the angle θ from the joint surface 61 in the opposite direction to the rotating direction of the crankshaft 16. This angle θ is set to an angle of within 45° e.g., 30° or thereabouts.

An oil groove 9 for allowing the oiling passage 15 and each of the oil holes 8a and 8b to communicate with each other is formed on outer diameter surfaces of the both split outer ring halves 3a and 3b along the circumferential direction. As a result, the lubricating oil from the oiling passage 15 is supplied to the oil groove 9, and is introduced to the oil holes 8a and 8b from this oil groove 9. Further, the lubricating oil which flowed into the oil holes 8a and 8b is supplied between each of the split outer ring halves 3a and 3b and the crankshaft 16, thereby lubricating the outer diameter surface of the crankshaft 16 as well as the peripheral surfaces of the outer ring raceway surface 6 and the rollers 4.

In this embodiment, the oil holes 8a and 8b are respectively disposed at positions located at the angle of within 45° from the respective joint surfaces 60 and 61 of both split outer ring halves 3a and 3b in the opposite direction to the rotating direction of the crankshaft 16. Namely, since the oil holes 8a and 8b are disposed in the vicinities of the mating plates 60 and 61 and at upstream-side positions by using the rotating direction of the crankshaft 16 as a reference, the lubricating oil from the oil holes 8a and 8b can be supplied efficiently to the vicinities of the mating plates 60 and 61 of both split outer ring halves 3a and 3b by the rotation of the crankshaft 16 and the rolling of the rollers 4.

As a result, an oil film of such a thickness as to allow the impact when the rollers 4 pass the mating plates 60 and 61 to be alleviated can be reliably formed on the outer ring raceway surface 6 in the vicinity of the mating plates 60 and 61. Consequently, it is possible to alleviate the impact of the rollers 4 passing the vicinities of the mating plates 60 and 61 and thereby suppress the generation of vibration and noise.

In addition, since the oil holes 8a and 8b are respectively located at positions at the angle of within 45° in the circumferential direction from the respective joint surfaces 60 and 61, and are disposed outside the loaded zone of the bearing, it is possible to alleviate the concentration of the stress at the peripheral edges of the oil holes 8a and 8b when the rollers 4 pass the oil holes 8a and 8b. The service life of the bearing can be thereby prolonged.

Figure 3:
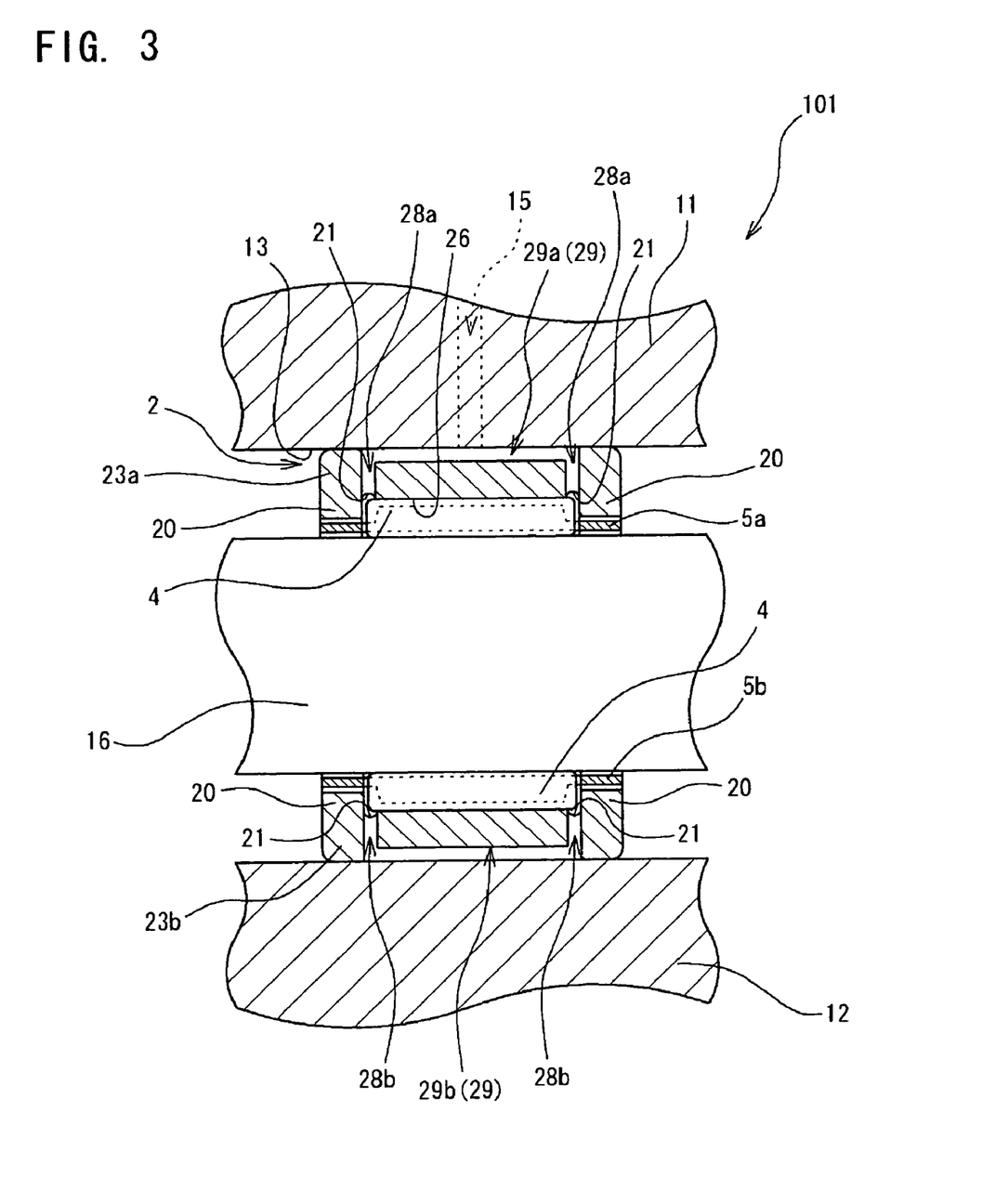
FIG. 3 is an explanatory axially parallel cross-sectional view of the bearing apparatus in accordance with a second embodiment of the invention.

FIG. 3 is an explanatory axially parallel cross-sectional view of a bearing apparatus 101 in accordance with another embodiment (second embodiment) of the invention. It should be noted that, in the embodiment shown in FIG. 3, those configurations and elements that are identical to those of the embodiment shown in FIGS. 1 and 2 are denoted by the same reference numerals as those of FIGS. 1 and 2. A detailed description thereof will be omitted for the sake of simplicity.

A pair of annular rib portions 20 which project radially inward are respectively formed at both axial ends of respective inner diameter surfaces of split outer ring halves 23a and 23b. A pair of annular recess portions (ground recess portions) 21, which are recessed radially outward, are each provided at a boundary portion between an outer ring raceway surface 26 of the split outer ring halves 23a and 23b and each of mutually opposing inner surfaces of the pair of rib portions 20.

A pair of oil holes 28a are formed in the split outer ring half 23a in such a manner as to penetrate the split outer ring half 23a in the radial direction and to be open to the respective recess portions 21. Meanwhile, a pair of oil holes 28b are formed in the split outer ring half 23b in such a manner as to penetrate the split outer ring half 23b in the radial direction and to be open to the respective recess portions 21.

Namely, in contrast to the fact that the oil holes 8a and 8b shown in FIG. 2 are formed so as to be open to the outer ring raceway surface 6, the oil holes 28a and the oil holes 28b shown in FIG. 3 are formed so as to be open to the pair of recess portions 21 each provided at the boundary portion between each of the pair of rib portions 20 and the outer ring raceway surface 26.

Further, the circumferential both ends of the both split outer ring halves 23a and 23b, although not shown, abut against each other, and these abutment surfaces constitute the joint surfaces 60 and 61 (see FIG. 1).

Each of the oil holes 28a is disposed at a position located at the angle θ from the joint surface 60 in the opposite direction to the rotating direction of the crankshaft 16, while each of the oil holes 28b is disposed at a position located at the angle θ from the joint surface 61 in the opposite direction to the rotating direction of the crankshaft 16.

An oil groove 29 for allowing the oiling passage 15 to communicate with the oil holes 28a and the oil holes 28b is formed on outer diameter surfaces of the both split outer ring halves 23a and 23b. This oil groove 9 consists of a branch line 29a which extends axially from one oil hole 28a so as to be connected to the other oil hole 28a; a branch line 29b which extends axially from one oil hole 28b so as to be connected to the other oil hole 28b; and a trunk line (not shown) which extends circumferentially from the oiling passage 15 so as to connect the branch line 29a and the branch line 29b. As a result, the lubricating oil from the oiling passage 15 is first supplied to the trunk line of the oil groove 29, and is then introduced to the oil holes 28a and the oil holes 28b via the branch lines 29a and 29b. The lubricating oil which flowed into the oil holes 28a and the oil holes 28b is supplied between each of the split outer ring halves 23a and 23b and the crankshaft 16, thereby lubricating the outer diameter surface of the crankshaft 16 as well as the peripheral surfaces of the outer ring raceway surface 26 and the rollers 4.

In this embodiment, since the oil holes 28a and the oil holes 28b are respectively open to the pair of recess portions 21 each provided at the boundary portion between each of the pair of rib portions 20 and the outer ring raceway surface 26, the rollers 4 rolling on the outer ring raceway surface 26 are not brought into direct contact with peripheral edges of the oil holes 28a and the oil holes 28b. For this reason, it is possible to virtually eliminate the stress concentration at the peripheral edges of the oil holes 28a and the oil holes 28b, which would otherwise occur due to the direct contact with the peripheral edges of the oil holes 28a and the oil holes 28b. Consequently, it is possible to further prolong the service life of the bearing.

In addition, as the pair of annular rib portions 20 are provided at the both axial ends of the inner diameter surfaces of the split outer ring halves 23a and 23b, the lubricating oil supplied between each of the split outer ring halves 23a and 23b and the crankshaft 16 can be suppressed from flowing out to the outside of the split rolling bearing 2 from the outer ring raceway surface 26. This allows the split rolling bearing 2 to easily retain the lubricating oil in its interior, thereby making it possible to eliminate the wastefulness of the lubricating oil.

Figure 4:
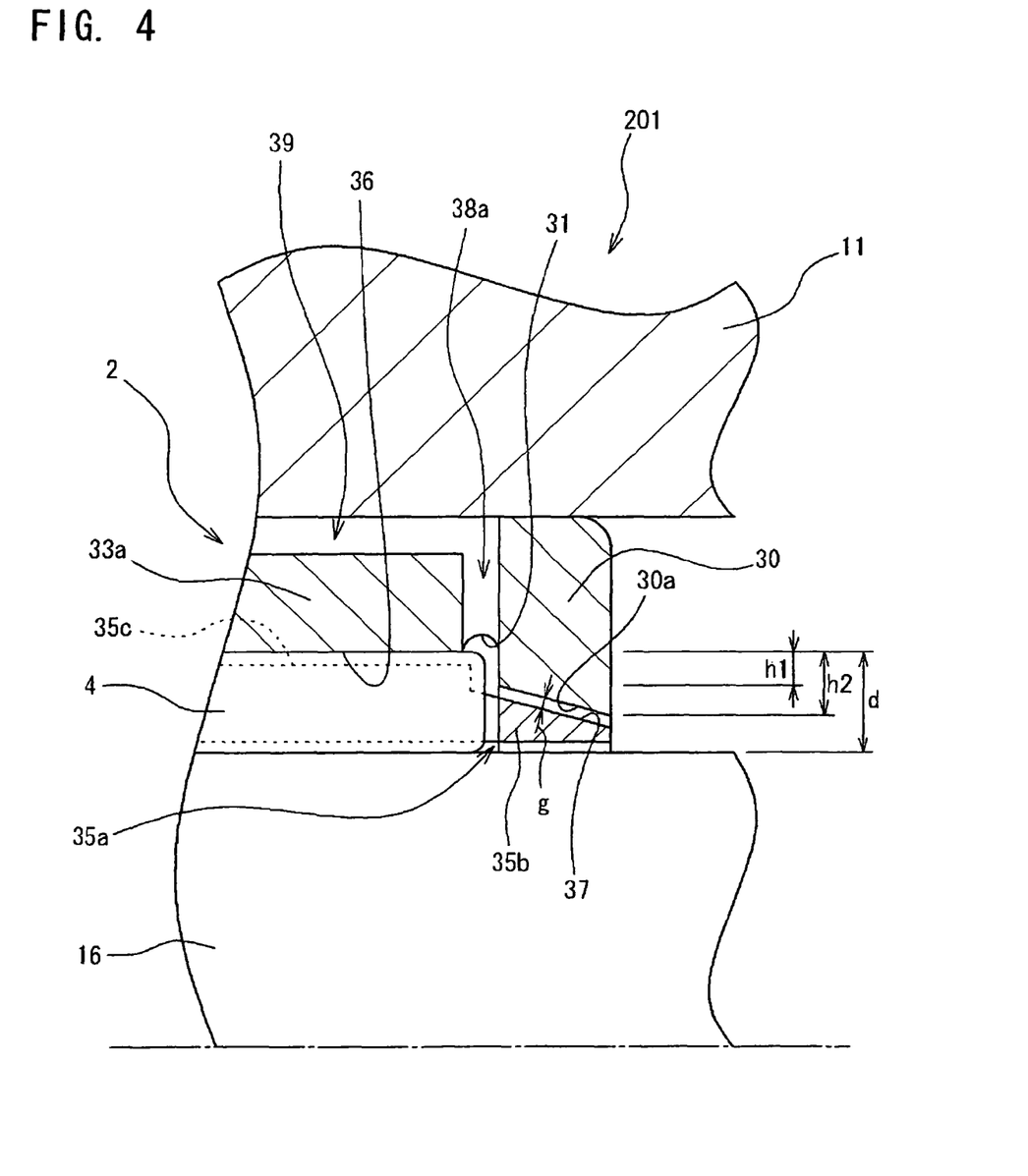
FIG. 4 is an explanatory axially parallel enlarged cross-sectional view of an essential portion of the bearing apparatus in accordance with a third embodiment of the invention.

FIG. 4 is an explanatory axially parallel enlarged cross-sectional view of an essential portion of a bearing apparatus 201 in accordance with still another embodiment (third embodiment) of the invention. It should be noted that, in the embodiment shown in FIG. 4, those configurations and elements that are identical to those of the embodiments shown in FIGS. 1 to 3 are denoted by the same reference numerals as those of FIGS. 1 to 3. A detailed description thereof will be omitted for the sake of simplicity.

FIG. 4 shows one split outer ring half 33a of a pair of split outer ring halves and one split cage half 35a of a pair of split cage halves. Although respective axial one sides of the split outer ring half 33a and the split cage 35a are shown, the other sides thereof are also constructed in the same way.

The split outer ring half 33a shown in FIG. 4 has a pair of annular rib portions 30 each provided at an axial end portion of the inner diameter surface thereof as well as a pair of annular recess portions 31 each recessed radially outward and provided at a boundary portion between an outer ring raceway surface 36 of the split outer ring half 33a and an inner surface of the rib portion 30, Further, a pair of oil holes 38a are each formed in the split outer ring half 33a in such a manner as to penetrate the split outer ring half 33a in the radial direction and to be open to the recess portion 21. Meanwhile, an oil groove 39 for allowing that oil hole 38a and the oiling passage (see FIGS. 1 to 3) to communicate with each other is formed on an outer diameter surface of the split outer ring half 33a.

The rib portion 30 is formed such that the inner diameter of its one axial end on the recess portion 31 side is smaller than the inner diameter of its other axial end (on the outer ring side-surface side), and its inner diameter surface is formed as a tapered surface 30a. Meanwhile, a tapered surface 37 whose diameter is smaller on its other axial end side is formed on an outer diameter surface of an annular portion 35b of the other axial end of the split cage half 35a in conformity with the shape of the tapered surface 30a of the rib portion 30.

Namely, in contrast to the fact that the inner diameter surface of the rib portion 20 and the outer diameter surface of the annular portion of the axial end portion of the split cage half 5a are respectively in a flat state, tapered surfaces are respectively formed on the inner diameter surface of the rib portion 30 and the outer diameter surface of the annular portion of the axial end portion of the split cage half 35a.

The projecting height h1 of the tapered surface 30a on the recess portion 31 side thereof is set to be ⅓ to ½ of the diameter d of the roller 4, while the projecting height h2 on the outer ring side-surface side thereof is set to be ½ to ⅔ of the diameter d of the roller 4. Further, the gap g between the tapered surface 30a of the rib portion 30 and the tapered surface 37 on the outer diameter surface of the annular portion 35b of the cage half 35a is set to be 1/10 to 2/10 of the diameter d of the roller 4.

The efflux of the lubricating oil to the outside of the bearing can be suppressed by the provision of the rib portions 30, as described above. However, as the inner diameter surface of each rib portion 30 and the outer diameter surface of the annular portion 35b of the cage half 35a are formed as tapered surfaces as in the case of this embodiment, the lubricating oil which tends to flow out from between the rib portion and the cage to the outside can be returned to the inner side of the bearing by imparting thereto a centrifugal force based on the rotation of the cage. Accordingly, it is possible to substantially eliminate the efflux of the lubricating oil to the outside of the bearing.

In addition, as the projecting height h2 of the tapered surface 30a on the outer ring side-surface side thereof is set to be ½ to ⅔ of the diameter d of the roller 4, it is possible to prevent the ingress of oil components from outside the bearing (oil components used in other sliding parts and containing foreign substances) into the bearing interior.

In this embodiment, an outer diameter of a column portion 35c provided between adjacent ones of pockets (not shown) of the split cage half 35a is set to be larger than the inner diameter of the rib portion 30. As a result, the lubricating oil which moved on the tapered surface 37 of the annular portion 35b of the cage half 35 to the bearing interior side can be reliably guided to the outer ring raceway surface 36. In addition, it is also possible to obtain an advantage in that the strength of the cage half 35a can be improved, and its deformation can be prevented.

It should be noted that the invention is not limited to the foregoing embodiments, and various modifications can be added. For example, although in the foregoing embodiments a configuration has been shown in which the respective oil holes are disposed at positions of the same angle θ from the joint surface, it is possible to adopt a configuration in which the respective oil holes are disposed at positions of different angles. The angles θ can be appropriately selected insofar as the oil holes are respectively disposed at positions of angles falling within 45° from the joint surface in the opposite direction to the rotating direction of the crankshaft 16.

In addition, although in the embodiment shown in FIG. 4 the tapered surface 30a and the tapered surface 37 are respectively shown in shapes in which the diameter is gradually decreased, the shape may be such that an identical diameter portion is included partially.

What is claimed is:

1. A bearing apparatus for supporting a shaft to a housing which includes a support hole and an oiling passage connected to the supporting hole to supply lubricating oil, the bearing apparatus comprising:
   two split outer ring halves which include outer ring raceway surfaces formed on inner diameter surfaces of the split outer ring halves and joint surfaces formed at circumferential ends of the split outer ring halves and are disposed in close contact with each other at the joint surfaces within the supporting hole of the housing, respectively; and
   a plurality of rollers which are disposed so as to be capable of rolling on the outer ring raceway surface and support the shaft,
   wherein each of the two split outer ring halves includes an oil hole penetrating the split outer ring half in a radial direction thereof and each of the two split outer ring halves includes an oil groove formed on an outer diameter surface of the split outer ring half along a circumferential direction thereof such that the oil groove extends less than the entire circumference of each one of the split outer ring halves so as to allow the oiling passage and the oil holes to communicate with each other,
   wherein each of the oil holes is disposed at a position located at an angle of within approximately 45° from the joint surface of the split outer ring halves in an opposite direction to a rotating direction of the shaft, and
   wherein the oil holes are disposed outside a loaded zone of the bearing apparatus.

2. The bearing apparatus according to claim 1, wherein two annular rib portions which project radially inward are respectively formed at opposite axial ends of the respective inner diameter surfaces of the split outer ring halves, and two recess portions recessed radially outward are each provided at a boundary portion between the outer ring raceway surface and an inner side surface of each of the pair of rib portions.

3. The bearing apparatus according to claim 2, wherein a tapered surface is formed on an inner diameter of each of the rib portions so that a projecting height of an axially inside part of each tapered surface is set smaller than that of an axially outside part of each tapered surface.

4. The bearing apparatus according to claim 3 further comprising split cage halves for holding the rollers so as to dispose the rollers at substantially equal intervals in a circumferential direction, each split cage half having an annular portion on each axial end portion, and each axial end portion having a tapered surface in conformity with a shape of the tapered surface of a respective rib portion.

5. The bearing apparatus according to claim 1, wherein the oil groove connects the oil hole on each of the two split outer ring halves to each other.

6. The bearing apparatus according to claim 1, wherein the oil groove extends along the outer diameter surface of each of the two split outer ring halves from the oiling passage to the oil hole disposed circumferentially furthest from the oiling passage.

7. The bearing apparatus according to claim 1, wherein the oil groove comprises a recess in the outer diameter surface of each of the split outer ring halves.

8. The bearing apparatus according to claim 1, wherein oil holes are disposed axially between axial ends of the plurality of rollers.

\* \* \* \* \*